United States Patent [19]
Sweat et al.

[11] Patent Number: 5,619,636
[45] Date of Patent: Apr. 8, 1997

[54] MULTIMEDIA PUBLISHING SYSTEM

[75] Inventors: Mark E. Sweat, Encinitas; Philip G. Van Valkenberg; Cheri D. Melville, both of San Diego; Philip N. McDonnell, Trabuco Canyon; Cyrus M. Kamada, Encinitas; James R. Wirt; James C. Chang, both of San Diego, all of Calif.

[73] Assignee: Autodesk, Inc., San Rafael, Calif.

[21] Appl. No.: 198,220

[22] Filed: Feb. 17, 1994

[51] Int. Cl.$^6$ .................................................. G06F 3/00
[52] U.S. Cl. ..................... 395/806; 395/133; 395/614; 395/173; 395/326; 395/348; 364/DIG. 1
[58] Field of Search ...................... 395/157–161, 395/275, 600, 650, 133, 152, 155, 159, 919, 154

[56] References Cited

U.S. PATENT DOCUMENTS

| | | | |
|---|---|---|---|
| 4,685,003 | 8/1987 | Westland | 360/14 J |
| 4,729,044 | 3/1988 | Kiesel | 360/14.3 |
| 4,893,256 | 1/1990 | Rutherfoord et al. | 395/154 |
| 4,931,950 | 6/1990 | Isle et al. | 395/11 |
| 4,937,685 | 6/1990 | Barker et al. | 360/14.1 |
| 4,939,594 | 7/1990 | Moxon et al. | 360/14.1 |
| 4,943,866 | 7/1990 | Barker et al. | 358/335 |
| 4,949,193 | 8/1990 | Kiesel | 360/14.1 |
| 4,964,004 | 10/1990 | Barker | 360/14.1 |
| 4,979,050 | 12/1990 | Westland et al. | 360/14.1 |
| 5,276,816 | 1/1994 | Cavendish et al. | 395/275 |
| 5,287,447 | 2/1994 | Miller et al. | 395/157 |
| 5,291,587 | 3/1994 | Kodosky et al. | 395/500 |
| 5,388,264 | 2/1995 | Tobias et al. | 395/650 |
| 5,408,659 | 4/1995 | Cavendish et al. | 395/650 |

OTHER PUBLICATIONS

*Digitalk*, "Developing Graphical Object–Oriented Applications with Smalltalk/V," Sep., 1993.
*InfoWorld*, "Component–based development / Infoworld tests how well four graphical products let you paint a masterpiece application," Apr. 12, 1993.
*Authology® Application Delivery in Unix, Questions and Answers*, American Training International, Jan. 12, 1992, two pages.
*Authology®: Multimedia v2.0 Technical Brief*, American Training International, Jan., 1992, eight pages.
*MEDIAscript OS/2 Professional Edition, Version 1.04 Fact Sheet*, Network Technology Corporation, Aug. 1992, four pages.

*Primary Examiner*—Thomas G. Black
*Assistant Examiner*—Hosain T. Alam
*Attorney, Agent, or Firm*—Merchant, Gould, Smith, Edell, Welter & Schmidt

[57] ABSTRACT

A highly integrated computer-implemented system for authoring multimedia applications is disclosed. The system includes an object-oriented database for simplifying manipulation of media resources and an authoring tool for defining the details of a multimedia application. The authoring tool is divided into screen editor and iconic editor panes, wherein operators can create interactions by wiring together icons representative of object modules.

21 Claims, 9 Drawing Sheets

MULTIMEDIA PUBLISHING SYSTEM

BACKGROUND OF THE INVENTION

1. Field of the Invention

This invention relates in general to a computerized system and method for authoring multimedia applications.

2. Description of Related Art

A new wave of information dissemination technology known as multimedia combines audio, video, still photographs, graphics, and text with interactive controls for presenting information. The growing acceptance of multimedia has increased the demand for new applications and with it the demand for tools for developing multimedia applications. In order to create a true multimedia experience, developers of multimedia applications have been faced with a steep learning curve in view of the multiple development tools which must be mastered and in view of recreating media resources.

Prior systems for authoring multimedia applications are typically procedural or course-flow based, and thus geared towards producing linear applications. One major drawback of these types of systems is that they simply do not have the ability to create sophisticated simulations, discovery-based interactive environments, and other non-linear applications.

Another major drawback with prior systems is that although they may provide "point and click" operations for simple interactions, they often resort to a scripting language or typical programming language for more complex interactions.

It can seen then that there is a need for a comprehensive development system for multimedia applications which has a visual interface, readily lends itself to reusable media, and provides sophisticated authoring tools. Without such a comprehensive system there is substantial duplication of both human and machine effort in reviewing, re-creating, and/or re-formatting data for use during the different stages of application fabrication and project management.

SUMMARY OF THE INVENTION

To overcome the limitations in the prior art described above, and to overcome other limitations that will become apparent upon reading and understanding the present specification, the present invention discloses a highly integrated system and method for layout and authoring multimedia applications, including an object-oriented database for simplifying manipulation of media resources and an authoring tool for defining the details of a multimedia application. The authoring tool is divided into visual and icon panes, wherein operators can create interactions by wiring together icons representative of object modules.

BRIEF DESCRIPTION OF THE DRAWING

Referring now to the drawing in which like reference numbers represent corresponding parts throughout.

DETAILED DESCRIPTION OF THE PREFERRED EMBODIMENT

Figure 1:
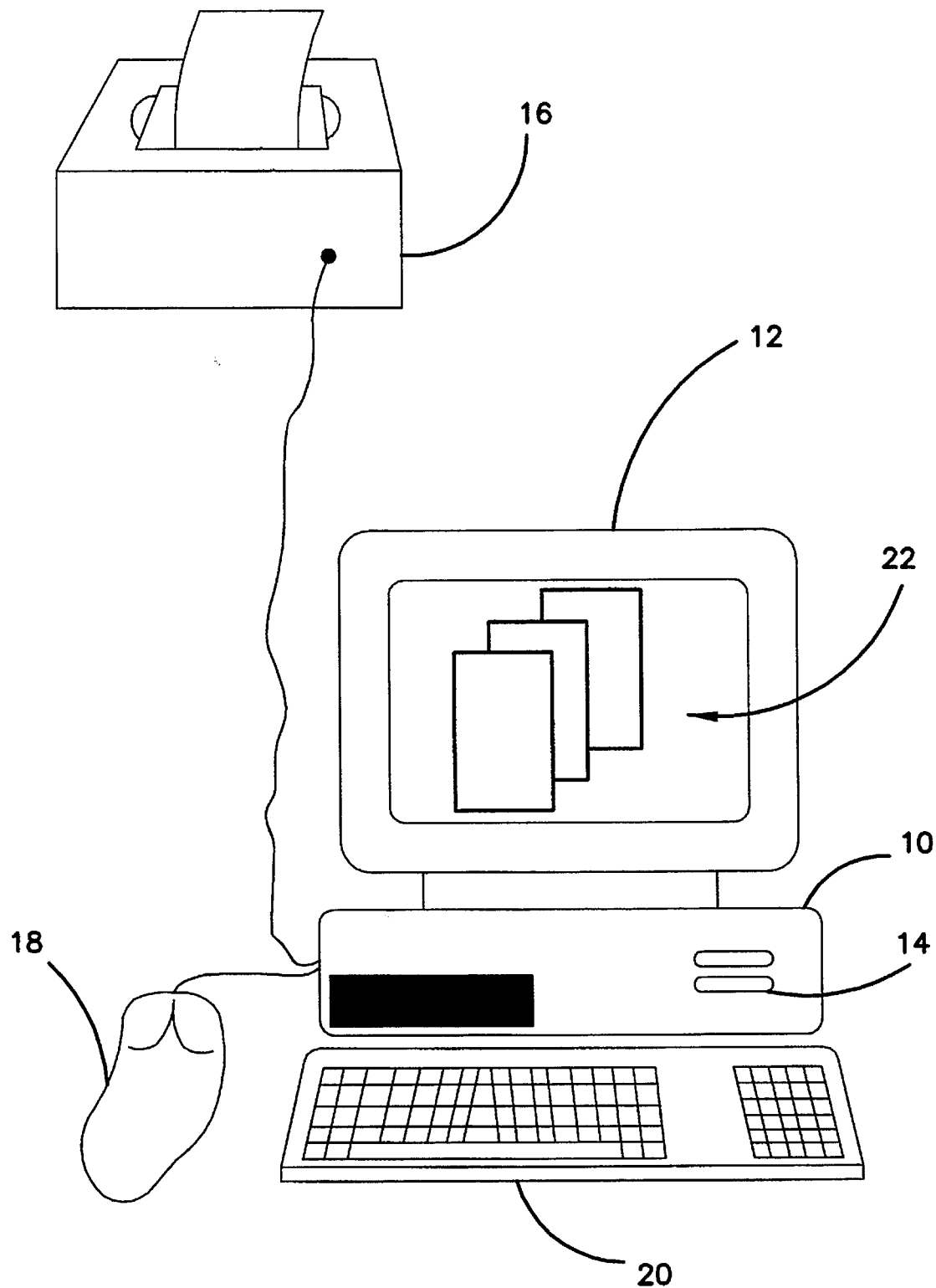
FIG. 1 illustrates one possible embodiment of the hardware comprising the present invention.

In the following description of the preferred embodiment, reference is made to the accompanying drawing which forms a part hereof, and in which is shown, by way of illustration, a specific embodiment in which the invention may be practiced. It is to be understood that other embodiments may be utilized and structural changes may be made without departing from the scope of the present invention.

Overview

The present invention provides a computer-implemented method and apparatus for authoring multimedia applications. The present invention is an object-oriented, graphical, point-and-click system that enables the operator to create sophisticated multimedia applications with minimal training time. The operator can specify interactions and application logic flow by connecting component icons.

The present invention is similar to a drawing program, in that an operator works in windows displayed by the computer and creates objects by selecting them from palettes of icons. Visual objects are created by "drawing" them in a window. Abstract or non-visual objects, such as programming controls and audio files, are placed as icons in a window.

Applications created with the present invention are constructed of components called modules. Modules can be simple objects such as lines, circles, polygons, static text, entry fields, group boxes, radio buttons, check boxes, list boxes, and other manner of icons, or can be much more complex structures containing several objects that communicate with each other. The present invention is delivered with a large library of existing modules, which facilitates rapid development of applications. Moreover, the library can be expanded by the operator creating custom modules for adding to the database.

Modules are connected or "wired together" to perform behaviors when specified events occur. For example, an operator can "wire" a button to a video object to indicate that when the button is clicked the video object plays. An operator can test individual interactions as they are put together, or go through an application in "step-through" mode to verify logic flow.

The present invention was created to meet the needs of both the high-level and expert-level operator with a system that is intuitive and flexible. Because it is an object-oriented authoring system, the present invention is extensible, making it easy to keep pace with the sophisticated requirements of multimedia application developers.

The present invention includes the following features:

A operator can create objects and specify events, actions, and parameters using a point-and-click graphical authoring environment.

An extensive set of graphic tools makes it easy for operators to create sophisticated effects.

Operators have access to a multimedia database containing predefined objects, and media objects in digital format. The media objects include video files, still images (bitmaps and scanned images), audio files, and text documents. Operators can select the objects they need, greatly reducing the need to "reinvent the wheel" each time an application is created.

Expert-level operators can create custom objects in Smalltalk™, and place them in the multimedia database, making these objects available to everyone using the database. Operators can access the multimedia database through natural language queries to create custom palettes of objects represented as icons.

Hardware

FIG. 1 illustrates one possible embodiment of the hardware comprising the present invention. The present invention is typically incorporated into a work station 10. The work station 12 in the preferred embodiment includes a processor, random access memory, VGA graphics support, a Digital Video Interactive (DVI®) board, multimedia-compatible audio support, and a Windows™ compatible audio board. It is envisioned that attached to the work station 10 will be a monitor 12, disk storage 14, and printer 16. Also included in the preferred embodiment are input devices, for example, a mouse pointing device 18 and a keyboard 20. The work station 10 may also be coupled to a CD-ROM player (not shown).

In the preferred embodiment of present invention, the PC is running under the WINDOWS™ Version 3.1 operating environment 22. However, the present specification does not go into details on how the WINDOWS™ operating environment 22 works nor how to program in the environment 22, as these details are well known in the art. The present specification assumes that the reader has an understanding of basic concepts within the WINDOWS™ operating environment 22, such as selecting objects, editing text, working with menus and dialog boxes, etc.

Authoring System Structure

Figure 2A:
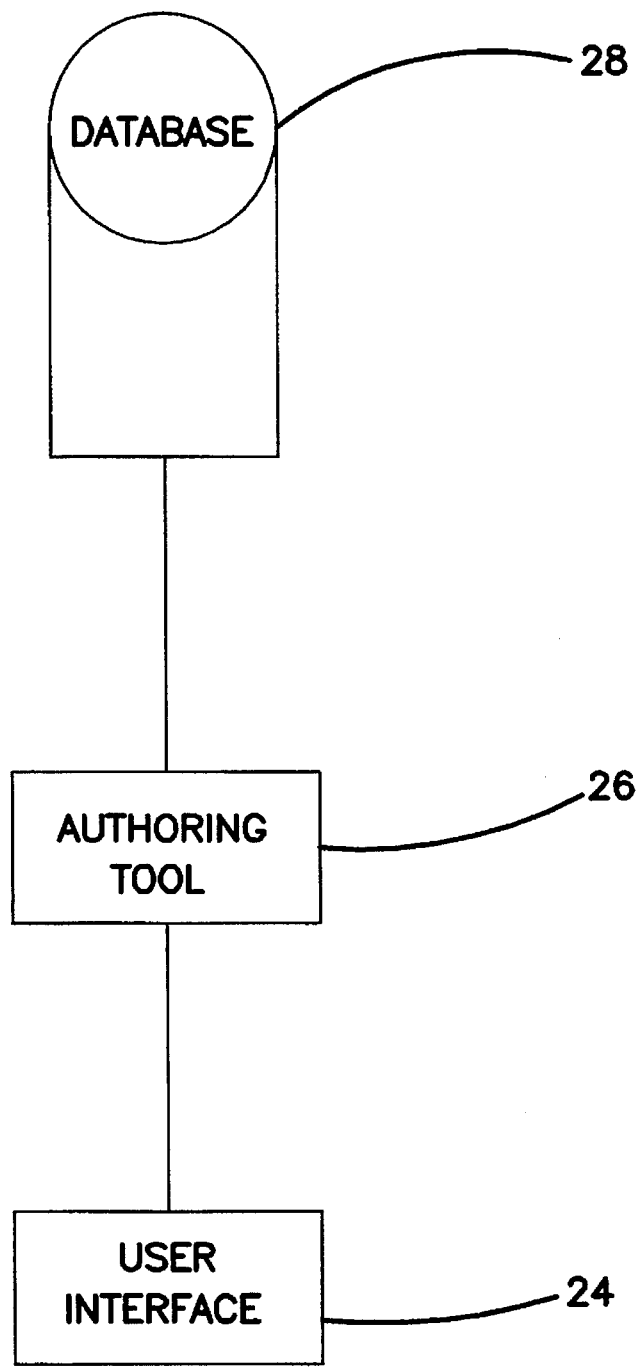
FIG. 2A depicts, in readily understandable block diagram form, the structure of the present invention.

FIG. 2A depicts, in readily understandable block diagram form, the structure of the present invention comprising a user interface 24, authoring tool 26, and multimedia database 28.

The user interface 24 has the basic "look and feel" of a standard Windows™ application. All authoring takes place inside windows that can be resized, tiled, or cascaded across the screen. Multiple windows can be open at the same time, thereby facilitating copying and pasting items from screen to screen, and application to application.

The authoring tool 26 includes a media manager that tracks references to all digital media via an object-oriented database 28 for storing media resources (video, graphics, animation, images, audio, and text), and that tracks and maintains references to media in applications. The media manager is linked transparently throughout the environment, thereby providing an operator with immediate access to media resources from any point in the development process to facilitate media reuse.

Figure 2B:
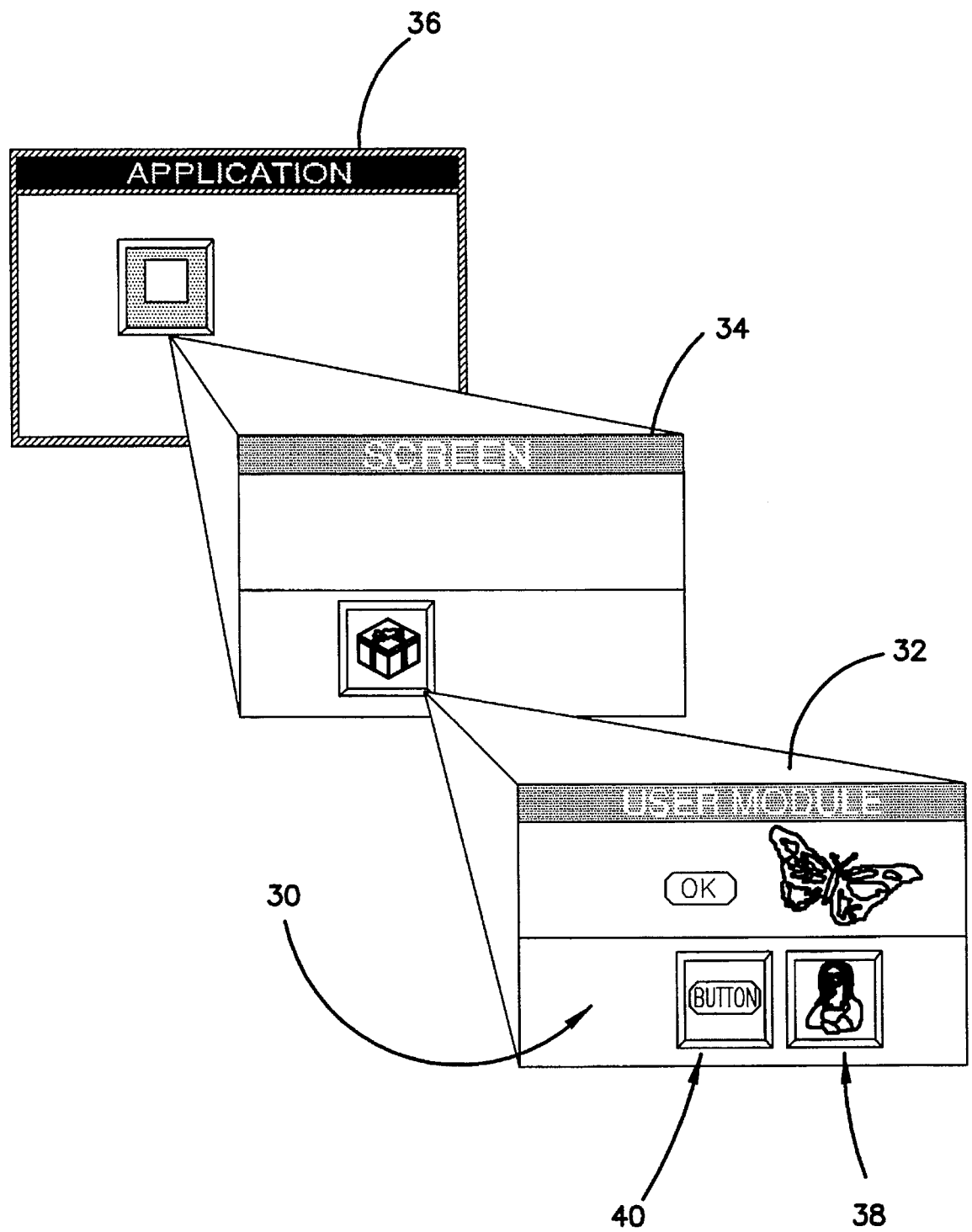
FIG. 2B depicts how multimedia applications are constructed hierarchically in accordance with the principles set forth in the present invention.

FIG. 2B depicts how multimedia applications are constructed hierarchically in accordance with the principles set forth in the present invention. The hierarchy comprises (from lowest to highest levels) object modules 30, user modules 32, screen modules 34, and applications 36. The modules in the present invention are Smalltalk™ objects with a unique "wrapper" defined by the present invention. This wrapper provides a consistent way to link objects together at all levels of the hierarchy.

Object modules 30 comprise lines, circles, polygons, static text, entry fields, group boxes, radio buttons, push buttons, scroll bars, menus, check boxes, list boxes, and other manner of icons. An object module 30 is generally not modified. The object module 30 may be generally categorized as either a media object module 38 or as a functional object module 40. Media object modules 38 store data such as video, audio, text, bitmaps, animation, or still pictures. Functional object modules 40 store information for performing a function which affects a media object module 38, such as a timer, radio button, push button, scroll bar, menu, etc. Other examples of functional object modules 40 include sequencer modules and global modules, wherein sequencer modules facilitate interactions that require events to occur in a sequential order and global modules may be used to communicate data among modules in an application 38, such as scoring data.

Object modules 30 cannot be opened and edited as can the higher level modules. Object modules are combined into more complex user modules 32 with specific types of behaviors or interactions. Modules can be put together in any number of ways, and can be "nested" so that modules contain modules that contain other modules, and so on. For example, a video module is an object module that simply plays a video file. A video player, however, would be a more complex module containing several primitive object modules, such as the video window and push buttons.

A file combining a plurality of modules is referred to as a user or container module 32. An example of a container module 32 is a video player module comprising a media object module 38, e.g., a video, linked to a functional object module 40, e.g., a push button icon, for displaying the video data in response to clicking the push button. Additional functional object modules 40 may be added to the video player container module 32, such as rewind, fast forward, freeze, or stop.

At a higher level, simple and complex container modules 32 are combined into a screen module 34. A screen module 34 has the default behavior of displaying and hiding the object modules contained within it. Another illustration of hierarchical combination is nesting of modules such that a complex container module 32 is created which contains hidden modules. For example, a first container module 32 could comprise a timer object module connected to a video object module. This first container module 32 could be referenced within a second container module 32 comprising further information and so forth.

At the highest level, the operator links screen modules 34 together to create an application 36. The application 36 can be simple linear screen order or can include sophisticated branching based on the operator's input.

Object and Container Modules

Figure 3:
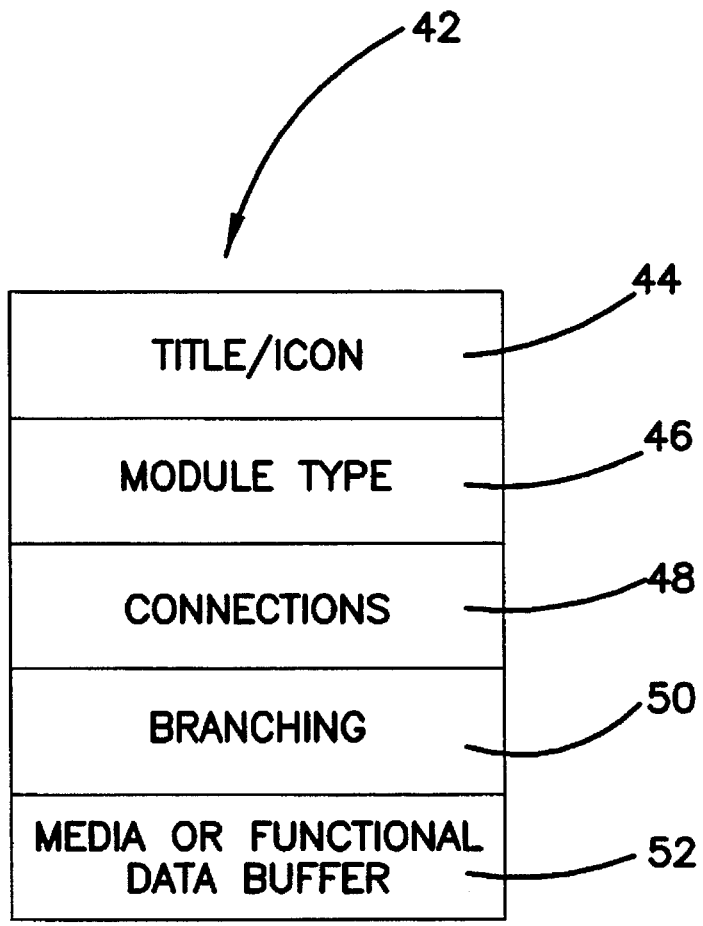
FIG. 3 depicts a structure for storing object modules.
Figure 4:
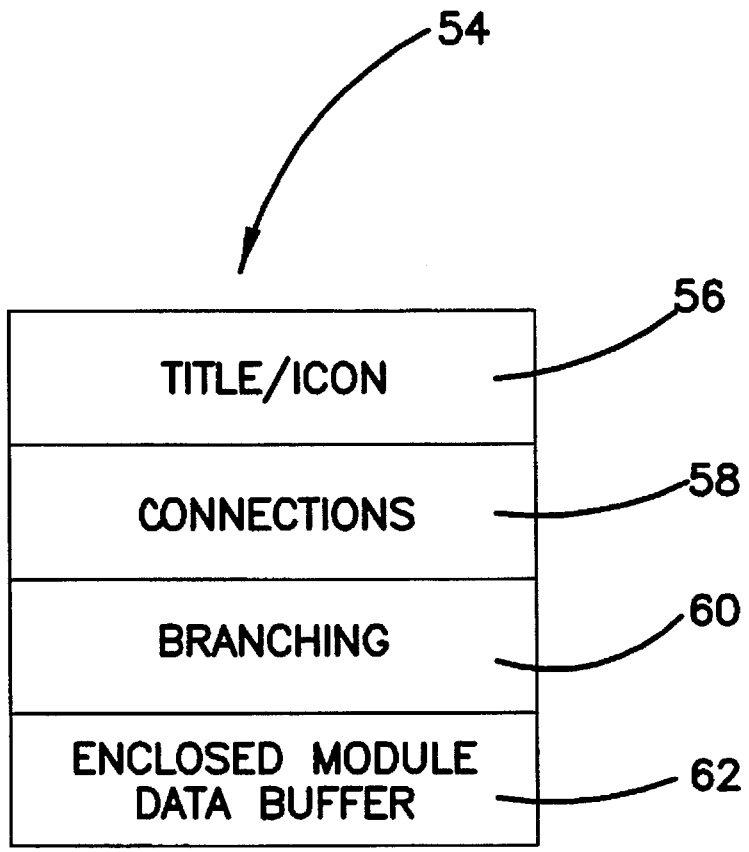
FIG. 4 depicts a structure for storing container modules.

FIGS. 3 and 4 depict structures for storing the object and the container modules, respectively. The object module structure 42 includes a title/icon buffer 44 for storing a textual description and an icon representation, a "type of module" buffer 46 containing information on whether the module comprises functional, video, audio, text, bitmap, animation, or still figure data, a "connections" buffer 48 identifying to which other modules connection is made, a "branching" buffer 50 for identifying any branching activity within the module, and a media or functional buffer 52 for storing digitized media or functional data.

The container module structure 54 is similar to the object module structure 42. Each container module structure 54 is arranged hierarchically such that it is accessible by a language descriptor and by an icon representation, both stored in a title/icon buffer 56. The container module structure 54 also includes a "connections" buffer 58 containing title information of any immediately preceding or immediately following screen modules, a "branching" buffer 60 detailing any branching activity, and an "enclosed module data buffer" 62 having title information of the object modules and other container modules linked within the select container module. If the container module is not a screen module, the connections buffer 58 is empty.

The Visual Programming Window

Figure 5:
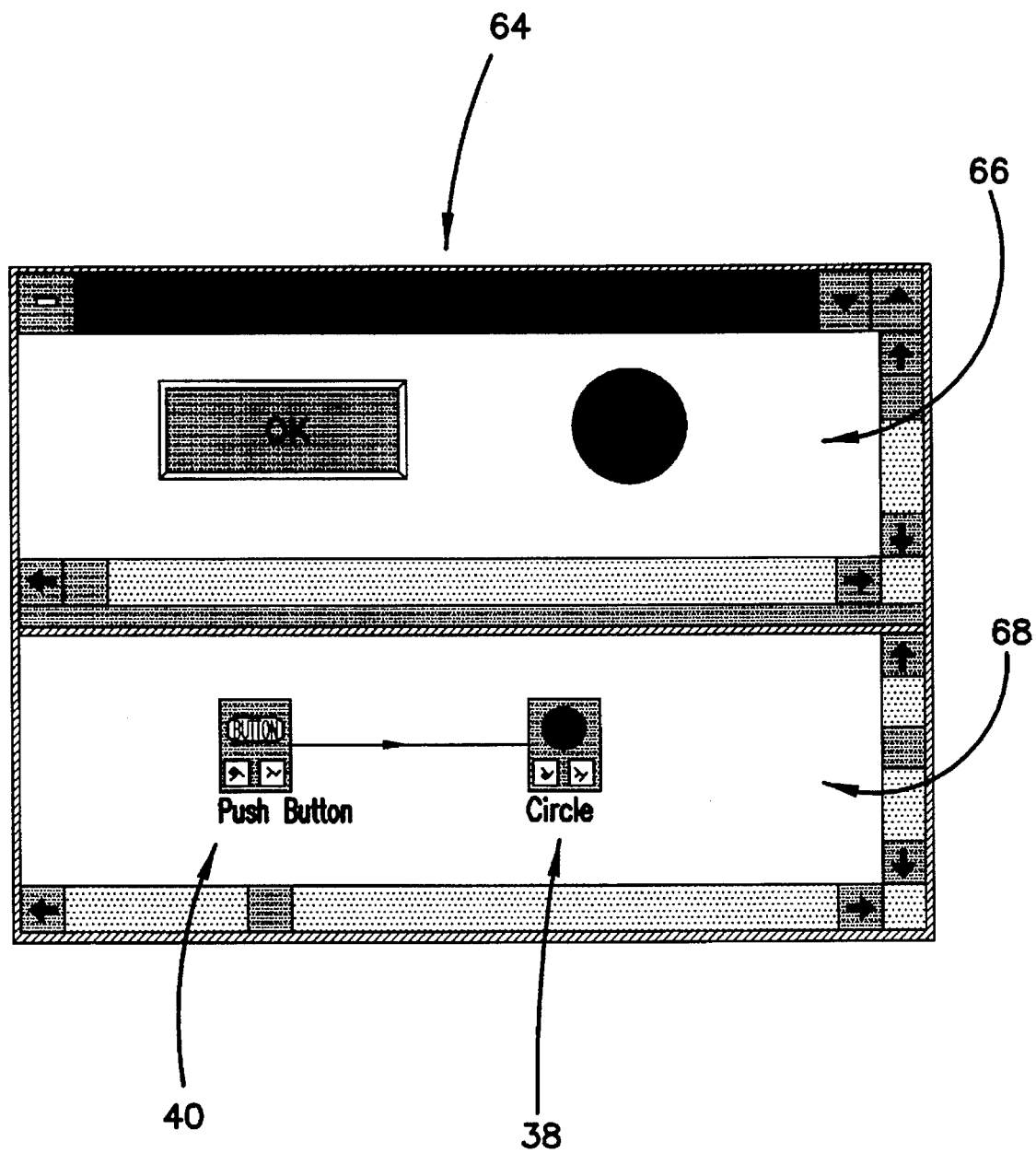
FIG. 5 depicts a split-screen Visual Programming Window (VPW) according to the present invention.

FIG. 5 depicts a split-screen Visual Programming Window (VPW) 64 according to the present invention. The VPW 64 is a work space for creating and editing modules. The VPW 64 is normally split into two panes: the Screen Editor pane 66 and the Iconic Editor pane 68. The Screen Editor pane 66 allows operators to modify the visible aspects of a module, such as its color, position, or size. The Iconic Editor pane 68 allows modification of the connections between modules, for example, linking a push button module to a video module. The VPW 64 can display the two panes 66 and 68 either simultaneously or exclusively. The dual work space includes vertically and horizontally sliding divider bars, allowing the ratio of the areas occupied by each pane 66 and 68 to be adjusted at any time. More than one VPW can be opened for a particular module. Modules can be cut and pasted between editing windows.

Screen Editor Pane

The operator will do most of the application creation in the Screen Editor pane 66 by creating modules. The Screen Editor pane 66 can be maximized (making it full screen), which provides the optimal amount of space for creating application screens. The Screen Editor pane 66 shows how a module will appear on screen. Its position and various graphical attributes can be directly manipulated with a variety of graphic tools. Optional alignment aids such as horizontal and vertical rulers and a grid are available in the Screen Editor pane 66. The positioning grid, which can vary in coarseness, is available both in Screen Editor 66 and Iconic Editor 68 panes.

New modules can be added to the module in the VPW 64 by dragging items from the module palette into the editing panes. When the object is dragged into the Screen Editor pane 66, an iconic representation of the object is placed in an analogous position in the Iconic Editor pane 68. If the object dragged into the Screen Editor pane 66 has no visual representation, then the icon is simply added to the Iconic Editor pane 68.

Iconic Editor Pane

The Iconic Editor pane 68 contains icons for each of the modules in the Screen Editor pane 66, plus icons for any non-visual modules in that screen. The purpose of the Iconic Editor pane 68 is to allow an operator to link or "wire" modules together to perform particular behaviors. Connections between these icons carry messages and parameters.

The iconic representation for a module consists of a bitmap picture, and from one to three lines of text describing the module. Each type of module is represented by a different picture, making it easier to distinguish between types of modules on the screen.

There is not necessarily a one-to-one correspondence between the visual and the iconic representations of modules. Because modules can contain more than one object, a single icon in the Iconic Editor pane 68 can represent a group of several objects in the Screen Editor pane 66. For example, there may be a module called "Video Player" that consists of a video window and three buttons. The visual representation of the module would have four objects; the iconic representation would be a single icon.

Selecting an iconic representation of a module in the Iconic Editor pane 68 selects the corresponding visual representation (if there is one) in the Screen Editor pane 66. This makes it easy to see which icon represents which visual module. This is particularly important when there are several modules of the same type on the screen.

The Palettes

Figure 6:
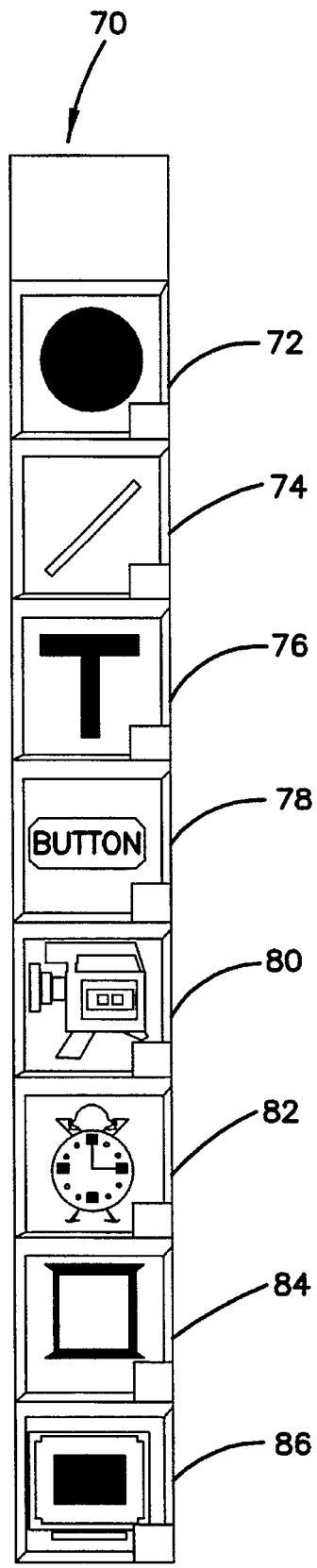
FIG. 6 illustrates a module palette displayed on the monitor by the present invention.
Figure 7:
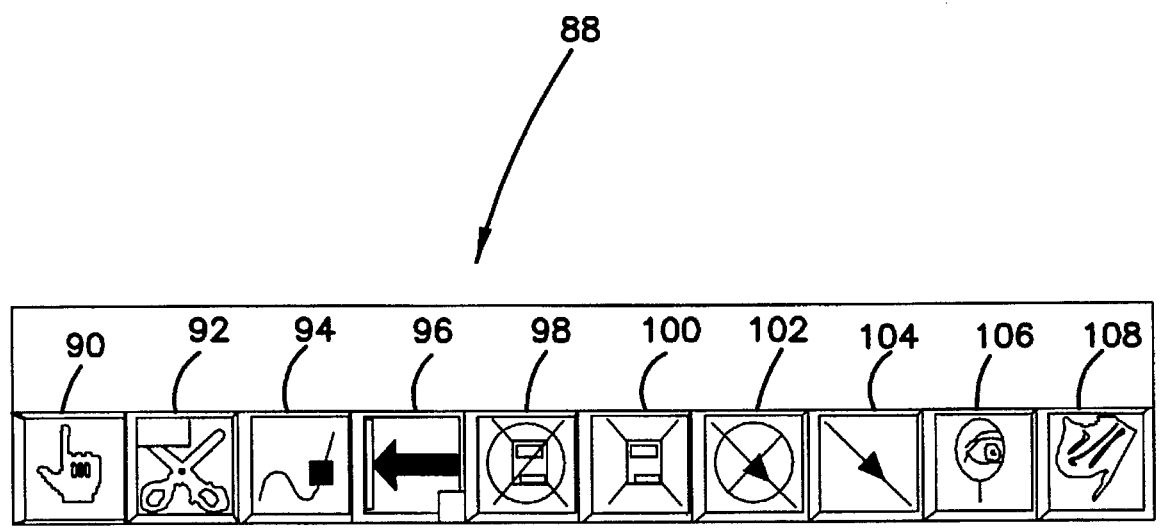
FIG. 7 illustrates a tool palette displayed on the monitor by the present invention.

FIGS. 6 and 7 illustrate the module and tool palettes displayed on the monitor by the present invention, respectively. Both palettes contain groups of icon buttons that can be selected by clicking the icon. In general, using these palettes is similar to using tools in a drawing package. Selecting a tool changes the cursor to indicate the selection.

The following are the default palettes displayed by the present invention:

Module palette: Contains the modules (the objects) an operator uses to construct an application. Modules include shapes (ellipse, rectangle, etc.), multimedia objects (video, audio, graphics, etc.), control objects (list boxes, scroll bars, buttons, etc.), and a screen module.

Tool palette: Contains tools for manipulating the modules in the editing windows. Tools include the select tool, the run tool, and the wire tool.

The Module and Tool palettes are resizeable, movable, and customizeable, using the standard Microsoft Windows™ conventions. When the operator sizes a palette to be smaller than full size, scroll bars appear to give access to the non-displayed portions of the palette.

To conserve screen area, icons with similar functions are grouped together, with the icons "folded" under a representative icon. For example, all of the icons for the shape modules (circle, ellipse, rectangle, etc.) are grouped under the rectangle icon. The operator "folds out" the buttons to select a module other than the representative (visible) module. Grouped icons have a special corner on them, which the operator clicks to fold out the group. This provides a visual cue as to which icons are group icons. The group 'stays out' until a selection is made, until another group is accessed, or until the palette looses focus.

Selecting a folded icon moves that icon into the primary, visible position in the palette, allowing the operator to select it without having to expand the group. This also allows the operator to customize the default icon displayed for the group of icons.

The palettes can also be customized, allowing the operators to add icons for custom objects or attributes.

The Module Palette

The Module palette 70 contains a number of icons, each representing a type of module. When the operator starts up the system, the Module palette 70 displayed is the "main"

Module palette. This palette contains the icons for: closed shapes 72, open shapes 74, text 76, interfaces 78 such as buttons, media objects 80, programming 82 or functional objects, containers 84 and drawing tools 86. In addition to the main Module palette 70, operators can create other module palettes containing specific collections of operator-defined modules from the multimedia database.

As projects progress, the number and variety of operator-defined modules in the database will increase. One of the primary goals of the present invention is to make these modules generally available to operators for reuse in their applications. To access operator-defined modules, operators create additional custom module palettes by performing a keyword search from the present invention database. Modules matching the description entered in the keyword field are displayed on a palette. Menu options are provided to load, save, and unload palettes, so that they can be reused by other operators.

Experienced operators can customize the main Module palette 70 by adding icons to represent operator-defined modules. Operator-defined modules are added to the Module palette 70 by dragging a module icon from an editing window, or from another Module palette 70, and dropping the icon into a palette. Module icons can be added to any position within the palette or its component groups by dropping the module icon into the appropriate position.

The Tool Palette

The Tool palette 86 contains icons for a set of tools that allow the operator to manipulate modules on both the Screen and Iconic Editor panes 66 and 68. The Tool palette 86 includes iconic style buttons representing tools including the Select 90, Cut 92, Align 94, Wire 96, Show and Hide Wiring 98, 100, 102, and 104, Inspect 106, and Run tools.

The Select tool 90 allows the operator to select an object for moving, sizing, or defining attributes.

The Alignment tool 94 is used to align visual modules or icons. The operator selects the modules to be aligned, and then selects the Align tool to align modules by their top, bottom, left, or right edges, or center points.

The Wire tool 96 is used to link modules in the Iconic Editor view. To use the Wire tool 96, the operator selects it from the palette, and then selects an originating module and a target module. A line is "rubberbanded" out from the originating module as the operator moves the cursor. Refer to the section "Creating an Application" below for a more detailed description of using the Wire tool 96 to connect modules.

The Show and Hide wiring tools 98, 100, 102, and 104 display and remove the wiring interconnections for specified icons (98 and 100) or all icons (102 and 104).

The Inspector tool 106 displays the labels and comments associated with each module when the mouse is moved over the screen.

The Run tool 108 is used to start modules. The Run tool 108 can be used to test selected lower level modules without having to run the entire application. Running an application's top-level module starts the application from the beginning. To use the Run tool 108, the operator selects a starting and an ending module from the Iconic Editor pane 68.

Creating an Application

Figure 8:
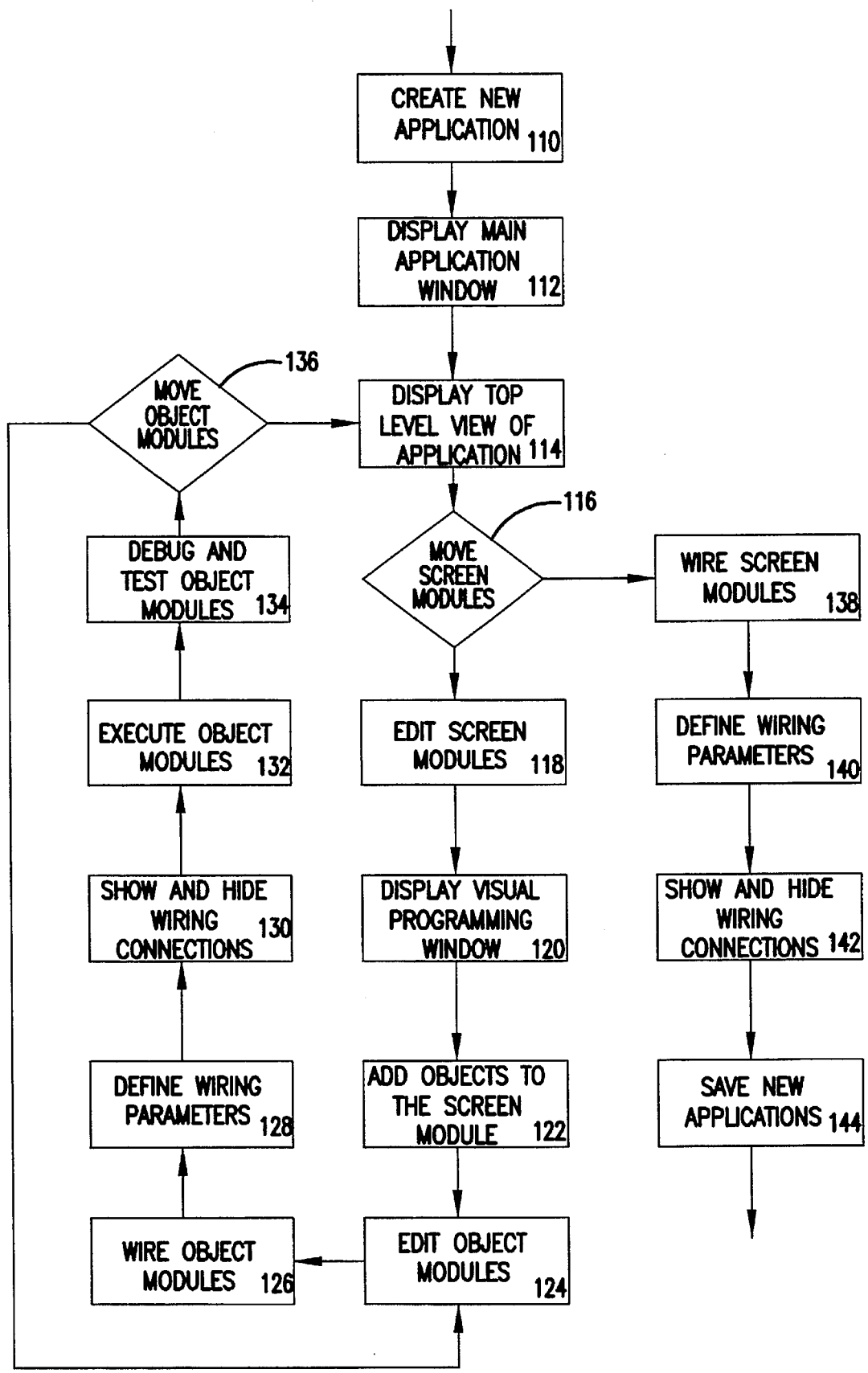
FIG. 8 is a flowchart illustrating of the logic used to create applications in the present invention.

FIG. 8 is a flowchart illustrating of the logic used in the present invention to create applications. Block 110 represents an operator initiating the present invention. Operators use the present invention much like a drawing package, in that they create applications using a palette of predefined modules, set the attributes of the modules using appropriate tools, and then wire-up the modules to obtain the desired results.

Block 112 represents the display of the Main Application Window. The Main Application Window is not an editing space. The operator must create a new application or open an existing application to open an editing window.

Block 114 represents the display of the top level view of the application. The top-level view of an application differs from the lower-level views in that the Visual Programming Window is displayed with only the Iconic Editor pane visible. In the top-level view, the operator creates an application by placing screen module icons in the Iconic Editor, and then "wiring" the screens together.

Block 118 represents the editing of a screen module. The operator selects a screen module from the Module palette, and clicks the cursor in the Iconic Editor pane to drop the icon for the screen module. Depending on the operator's preferred style of working, he or she can place several screen module icons at once and then edit the individual screens, or place a screen and edit it immediately.

Block 120 represents the displaying of the Visual Programming Window that allows the operator to edit the contents of the screen module. The Visual Programming Window for the screen module has both the Screen Editor and the Iconic Editor panes.

Block 122 represents adding visual elements to a screen module, wherein the operator places primitive modules from the Module palette into the Visual Programming Window. In general, placing modules in the Screen Editor is similar to using a standard drawing package. If the operator tries to place a non-visual module in the Screen Editor pane (for example, an audio module), it is rejected and placed in the Iconic Editor pane.

Block 124 represents the editing of object modules. Once a module has been placed in the Screen Editor pane of the Visual Programming Window, the operator can set the module's attributes. For example, a circle can be colored red, and a button's label can be specified. Modules can be selected and moved, deleted, copied, and cut or pasted between different (or the same) Visual Programming Windows.

Block 126 represents the wiring of connections between modules. Modules are wired together in the Iconic Editor pane of the Visual Programming Window. The operator determines how an application works by wiring modules together. This wiring sends a message with the name of a behavior (method) from the "sender" module to the "receiver" module. The message sent from a module is called an output event and the behaviors that can be performed by a module are called its input methods. When this message reaches the receiver, it triggers the specified behavior or "event." To wire modules together, the operator tells the sender which message to send, and the receiver which behavior to perform upon receipt of the message. For example, in wiring a button module to a video module, the operator would select the "clicked" message to send to the video object, and select the video object's "play" event as the behavior to perform when the "clicked" message is received.

Block 128 represents the specification of wiring parameters. Connections requiring parameters have a small parameter icon associated with the start of the connection. This parameter icon can be opened (clicked) to show its contents in tabular form. This table can be filled by wiring (using input methods as parameters), or by setting fixed parameters, such as numbers. Once the parameter table is correctly filled, the connecting line turns green, indicating a completed connection. Connections to and from parameter modules are shown only when the parameter icon is selected, or when the Show All Connections command is enabled on the Main menu.

Block 130 represents the showing and hiding of wiring interconnections. Operators can reduce the visual complexity of the wiring diagrams in the Iconic Editor by hiding connections between modules.

Block 132 represents the execution of a module. As they are working on an application, operators can test individual modules by selecting the module and then selecting the "Run" tool from the Tool palette. To run an application from the beginning, the operator uses the "RunIt" command from the Main Menu.

Block 134 represents the debugging of an object module. It is expected that the objects module's runtime error checking should catch most errors, certainly at the graphical authoring level. However, the present invention also provides a debugging view. This is integrated with the Smalltalk™ Debugger so that expert operators can debug their objects from within the context of an application.

Block 136 is a decision block regarding whether there are more object modules to edit in the screen module. If so, control transfers to block 124 to continue the editing process. If not, control transfers to block 114. After wiring the icons together in the Iconic Editor pane of the screen module, the operator closes the Visual Programming Window for the screen module, which returns to the top-level application view.

Block 116 is a decision block where the operator can create or edit another screen module, or wire screen modules together by connecting the output events from one (or more) screens to the input methods of other another screen, thereby creating an application branching flow.

Block 138 represents the wiring of screens. To wire screens together, operators use the same methods they use to wire lower-level modules together. As with lower-level modules, block 140 represents the specifying of parameters for the wiring interconnections between screens, block 142 represents the showing and hiding of wiring interconnections between screen modules, and block 144 represents the saving of the new application to end the application creation process.

Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for developing a multimedia application comprising:

(a) a processor having a monitor and data storage means attached thereto; and (b) an object-oriented multimedia database, in the data storage means, for storing media objects;

(c) the processor including means, coupled to the object-oriented multimedia database, for creating modules from the media objects stored in the multimedia database;

(d) the means for creating further comprising a split-screen Visual Programming Window means for creating and editing modules using the media objects stored in the multimedia database;

(e) the Visual Programming Window means being split into two panes comprising a Screen Editor and an Iconic Editor;

(f) the Screen Editor comprising means for modifying the visible aspects of a module selected from a group comprising color, position, or size;

(g) the Iconic Editor comprising means for modifying visual representations of functional connections between modules; and (h) wherein new objects and modules can be added to an edited module in the Visual Programming Window by dragging items from a module palette into one of the panes, so that when the objects and modules are dragged into one of the panes, so that when the objects and modules are dragged into the Screen Editor pane, an iconic representation of the objects and modules is placed in an analogous position in the Iconic Editor pane.

2. The system as set forth in claim 1, wherein the Iconic Editor pane contains icons for each of the modules in the Screen Editor pane, and further, wherein the Iconic Editor pane contains icons for any non-visual modules.

3. The system as set forth in claim 1, wherein the Iconic Editor comprises means for linking objects and modules together to perform particular behaviors by drawing wires between the icons, wherein the wires represent connections between the icons that transmit messages and parameters.

4. The system as set forth in claim 1, further comprising means for reusing operator-defined modules in the database by adding icons that represent the operator-defined modules to the module palette, wherein the means for reusing further comprises means for adding operator-defined modules to the module palette by dragging a module icon from the visual programming window means and dropping the module icon onto the module palette displayed on the monitor, wherein the module icon can be added to any position within the module palette and its component groups by dropping the module icon into an appropriate position.

5. The system as set forth in claim 1, wherein the modules comprise media object modules and functional object modules, the media object modules store data, and the functional object modules store functions that affect a media object module.

6. The system as set forth in claim 1, wherein the object modules are comprised of:

(1) a title/icon buffer for storing a textual description and an icon representation of the module;

(2) a type of module buffer containing information identifying the module as a media object module and a functional object module;

(3) a connections buffer identifying connections to other modules;

(4) a branching buffer for identifying any branching activity within the module; and (5) a buffer for storing digitized media and functional data.

7. The system as set forth in claim 1, wherein a plurality of the object modules are combined together to form a container module, and further, wherein the container modules are comprised of:

(1) a title/icon buffer for storing a textual description and an icon representation of the container module;

(2) a connections buffer identifying connections to other container modules;

(3) a branching buffer for identifying any branching activity within the container module; and (4) an enclosed module data buffer for storing title information of the object modules and other container modules linked within the container module.

8. A method for developing a multimedia application on a processor having a monitor and data storage means attached thereto, wherein an object-oriented multimedia database for storing media objects is stored in the data storage means, the method comprising the steps of:

(a) creating modules in the processor from the media objects stored in the multimedia database, further comprising the step of creating and editing the modules in a split-screen Visual Programming Window displayed on the monitor, wherein the visual Programming Window is split into two panes comprising a screen Editor and an Iconic Editor;

(b) modifying visible aspects of the modules in the Screen Editor, wherein the visible aspects are selected from a group comprising color, position, or size;

(c) modifying visual representations of functional connections between the modules in the Iconic Editor; and (d) adding new objects and modules to an edited module in the Visual Programming Window by dragging items from a module palette into one of the panes, so that when the new objects and modules are dragged into the Screen Editor pane, an iconic representation of the objects and modules is placed in an analogous position in the Iconic Editor pane.

9. The method as set forth in claim 8, wherein the Iconic Editor pane contains icons for each of the modules in the Screen Editor pane, and further, wherein the Iconic Editor pane contains icons for any non-visual modules.

10. The method as set forth in claim 8, wherein the modifying step (c) further comprises the step of linking objects and modules together to perform particular behaviors by drawing wires between the icons in the Iconic Editor, wherein the wires represent connections between the icons that transmit messages and parameters.

11. The method as set forth in claim 8, wherein the adding step (d) further comprises the step of reusing operator-defined modules in the database by adding icons that represent the operator-defined modules to the module palette, wherein the reusing step further comprises the step of adding operator-defined modules to the module palette by dragging a module icon from the visual programming window means and dropping the module icon onto the module palette displayed on the monitor, wherein the module icon can be added to any position within the module palette and its component groups by dropping the module icon into an appropriate position.

12. The method as set forth in claim 8, wherein the modules comprise media object modules and functional object modules, the media object modules store data, and the functional object modules store functions that affect a media object module.

13. The method as set forth in claim 8, wherein the object modules are comprised of:

(1) a title/icon buffer for storing a textual description and an icon representation of the module;

(2) a type of module buffer containing information identifying the module as a media object module and a functional object module;

(3) a connections buffer identifying connections to other modules;

(4) a branching buffer for identifying any branching activity within the module; and (5) a buffer for storing digitized media and functional data.

14. The method as set forth in claim 8, wherein a plurality of object modules are combined together to form a container module, and further, wherein the container modules are comprised of:

(1) a title/icon buffer for storing a textual description and an icon representation of the container module;

(2) a connections buffer identifying connections to other container modules;

(3) a branching buffer for identifying any branching activity within the container module; and (4) an enclosed module data buffer for storing title information of the object modules and other container modules linked within the container module.

15. An article of manufacture for use in programming a processor having a monitor and data storage means attached thereto, wherein an object-oriented multimedia database for storing media objects is stored in the data storage means, the article of manufacture comprising a processor-readable medium having one or more programs embodied therein for performing a method for developing a multimedia application, the method comprising the steps of:

(a) creating modules in the processor from the media objects stored in the multimedia database, further comprising the step of creating and editing the modules in a split-screen visual Programming Window displayed on the monitor, wherein the Visual Programming Window is split into two panes comprising a Screen Editor and an Iconic Editor;

(b) modifying visible aspects of the modules in the Screen Editor, wherein the visible aspects are selected from a group comprising color, position, or size;

(c) modifying visual representations of functional connections between the modules in the Iconic Editor; and (d) adding new objects and modules to an edited module in the visual Programming Window by dragging items from a module palette into one of the panes, so that when the new objects and modules are dragged into the Screen Editor pane, an iconic representation of the objects and modules are placed in an analogous position in the Iconic Editor pane.

16. The article of manufacture of claim 15 above, wherein the Iconic Editor pane contains icons for each of the modules in the Screen Editor pane, and further, wherein the Iconic Editor pane contains icons for any non-visual modules.

17. The article of manufacture of claim 15 above, wherein the modifying step (c) further comprises the step of linking objects and modules together to perform particular behaviors by drawing wires between the icons in the Iconic Editor, wherein the wires represent Connections between the icons that transmit messages and parameters.

18. The article of manufacture of claim 15 above, wherein the adding step (d) further comprises the step of reusing operator-defined modules in the database by adding icons that represent the operator-defined modules to the module palette, wherein the reusing step further comprises the step of adding operator-defined modules to the module palette by dragging a module icon from the visual programming window means and dropping the module icon onto the module palette displayed on the monitor, wherein the module icon can be added to any position within the module palette and its component groups by dropping the module icon into an appropriate position.

19. The article of manufacture of claim 15 above, wherein the modules comprise media object modules and functional object modules, the media object modules store data, and the functional object modules store functions that affect a media object module.

20. The article of manufacture of claim 15 above, wherein the object modules are comprised of:
   (1) a title/icon buffer for storing a textual description and an icon representation of the module;
   (2) a type of module buffer containing information identifying the module as a media object module and a functional object module;
   (3) a connections buffer identifying connections to other modules;
   (4) a branching buffer for identifying any branching activity within the module; and
   (5) a buffer for storing digitized media and functional data.

21. The article of manufacture of claim 15 above, wherein a plurality of object modules are combined together to form a container module, and further, wherein the container modules are comprised of:
   (1) a title/icon buffer for storing a textual description and an icon representation of the container module;
   (2) a connections buffer identifying connections to other container modules;
   (3) a branching buffer for identifying any branching activity within the container module; and
   (4) an enclosed module data buffer for storing title information of the object modules and other container modules linked within the container module.

* * * * *